US 6,625,345 B2

(12) United States Patent
Reznichenko

(10) Patent No.: US 6,625,345 B2
(45) Date of Patent: Sep. 23, 2003

(54) OPTICAL SWITCH USING FIXED AND MOVABLE MIRRORS

(75) Inventor: Yakov Reznichenko, Newton, MA (US)

(73) Assignee: Analog Devices, Inc., Norwood, MA (US)

( * ) Notice: Subject to any disclaimer, the term of this patent is extended or adjusted under 35 U.S.C. 154(b) by 36 days.

(21) Appl. No.: 10/050,634

(22) Filed: Jan. 16, 2002

(65) Prior Publication Data

US 2003/0133646 A1 Jul. 17, 2003

(51) Int. Cl.[7] .................................................. G02B 6/42
(52) U.S. Cl. ............................. 385/18; 385/33; 385/34; 359/223
(58) Field of Search ............................ 385/18, 24, 34, 385/33, 17, 27, 25, 47, 31; 359/291, 295, 223, 224

(56) References Cited

U.S. PATENT DOCUMENTS

| 6,253,001 | B1 |   | 6/2001 | Hoen ........................... 385/17 |
| 6,347,167 | B1 | * | 2/2002 | Hagelin ....................... 385/18 |
| 6,525,864 | B1 | * | 2/2003 | Gee et al. .................... 359/291 |
| 6,526,190 | B2 | * | 2/2003 | Holzapfel et al. ............. 385/33 |

FOREIGN PATENT DOCUMENTS

WO    WO 01/71809    9/2001    ........... H01L/29/00

* cited by examiner

Primary Examiner—Phan T. H. Palmer
(74) Attorney, Agent, or Firm—Bromberg & Sunstein LLP

(57) ABSTRACT

An optical switch uses a fixed mirror cover to reflect optical signals to and from fiber collimators and movable mirrors that are formed on a common substrate.

22 Claims, 13 Drawing Sheets

OPTICAL SWITCH USING FIXED AND MOVABLE MIRRORS

FIELD OF THE INVENTION

The present invention relates generally to optical switching, and more particularly to an optical switching system and apparatus using fixed and movable mirrors.

BACKGROUND OF THE INVENTION

An optical switch is used to switch optical signals between a number of optical inputs and a number of optical outputs.

An optical switch can be formed using two arrays of micro-machined mirrors, which are often referred to as Micro Electromechanical System (MEMS) arrays. Each MEMS array typically includes N mirrors. The MEMS arrays are typically positioned opposite each other. Such an optical switch is generally capable of switching optical signals from any of N input fibers to any of N output fibers.

In order to switch an optical signal from a selected input fiber to a selected output fiber, the optical signal is directed from the selected input fiber to a selected mirror on one MEMS array, which reflects the optical signal to a selected mirror on the other MEMS array, which reflects the optical signal toward the selected output fiber. Input fiber collimators are used to direct optical signals from the input fibers to the first MEMS array. Output fiber collimators are used to direct optical signals from the second MEMS array to the output fibers.

Such optical switches are typically complex and expensive. This is due in part to the cost and complexity of the fiber collimators and MEMS arrays that make up the optical switch.

SUMMARY OF THE INVENTION

In accordance with one aspect of the invention, an optical switching system and apparatus uses a fixed mirror cover to reflect optical signals to and from movable mirrors that are formed on a common substrate.

In accordance with another aspect of the invention, an N×N optical switching system includes a substrate having a surface including a plurality of input fiber collimators, a first plurality of movable mirrors, a second plurality of movable mirrors, and a plurality of output fiber collimators, and also includes a mirrored cover positioned facing said surface for directing optical signals from the plurality of input fiber collimators to the first plurality of movable mirrors, from the first plurality of movable mirrors to the second plurality of movable mirrors, and from the second plurality of movable mirrors to the plurality of output fiber collimators.

Each input fiber collimator is typically positioned relative to the mirrored cover so as to direct an optical signal from an input fiber to a predetermined mirror of the first plurality of mirrors via the mirrored cover. The mirrored cover may include an angled portion for directing the optical signals from the input fiber collimators to the first plurality of mirrors. The mirrored cover may include a curved portion for directing the optical signals from the input fiber collimators to the first plurality of mirrors. Each input fiber collimator may be set at a predetermined angle relative to the substrate so as to direct the optical signal to the predetermined mirror of the first plurality of mirrors via the mirrored cover. An input optical wedge may be positioned between the plurality of input fiber collimators and the mirrored cover for directing optical signals from the plurality of input fiber collimators to the first plurality of movable mirrors via the mirrored cover.

Each mirror of the first plurality of mirrors is positioned relative to the mirrored cover and to the second plurality of mirrors so as to direct an optical signal to a selected mirror of the second plurality of mirrors via the mirrored cover.

Each mirror of the second plurality of mirrors is positioned relative to the mirrored cover and to the plurality of output fiber collimators so as to direct an optical signal to a predetermined output fiber collimator via the mirrored cover. The mirrored cover may include an angled portion for directing the optical signals from the second plurality of mirrors to the plurality of output fiber collimators. The mirrored cover may include a curved portion for directing the optical signals from the second plurality of mirrors to the plurality of output fiber collimators. Each output fiber collimator may be set at a predetermined angle relative to the substrate so as to receive the optical signal from the predetermined mirror of the second plurality of mirrors via the mirrored cover. An output optical wedge may be positioned between the mirrored cover and the plurality of output fiber collimators for directing optical signals from the second plurality of movable mirrors to the plurality of output fiber collimators via the mirrored cover. Each output fiber collimator is substantially positioned so as to receive the optical signal from the predetermined mirror of the second plurality of mirrors via the mirrored cover axially.

The mirrored cover may be substantially flat. The mirrored cover may be angled toward the substrate at both ends. The mirrored cover may be curved toward the substrate.

The movable mirrors are typically controlled electronically. The optical switching system typically includes control logic for determining a desired position for each movable mirror and generating control signals for setting each movable mirror to its desired position.

In one embodiment of the invention, the optical switching system is configured as a 2×2 optical switch having a pair of input fiber collimators, a first pair of movable mirrors, a second pair of movable mirrors, and a pair of output fiber collimators. The input fiber collimators, movable mirrors, and output fiber collimators may be configured linearly on the substrate. The substrate may include two adjacent collimator/mirror configurations, where each collimator/mirror configuration includes one input fiber collimator from the pair of input fiber collimators, one movable mirror from the first pair of movable mirrors, one movable mirror from the second pair of movable mirrors, and one output fiber collimator from the pair of output fiber collimators.

In another embodiment of the invention, the optical switching system is configured as plurality of N×N optical switches. The substrate includes a plurality of N×N optical switching configurations, wherein each N×N optical switching configuration comprises an equal number of input fiber collimators from the plurality of input fiber collimators, movable mirrors from the first plurality of movable mirrors, movable mirrors from the second plurality of movable mirrors, and output fiber collimators from the plurality of output fiber collimators.

DETAILED DESCRIPTION OF A PREFERRED EMBODIMENT

An embodiment of the present invention uses a fixed mirror cover to reflect optical signals to and from movable mirrors that are formed on a common substrate within a single MEMS device.

Figure 1:
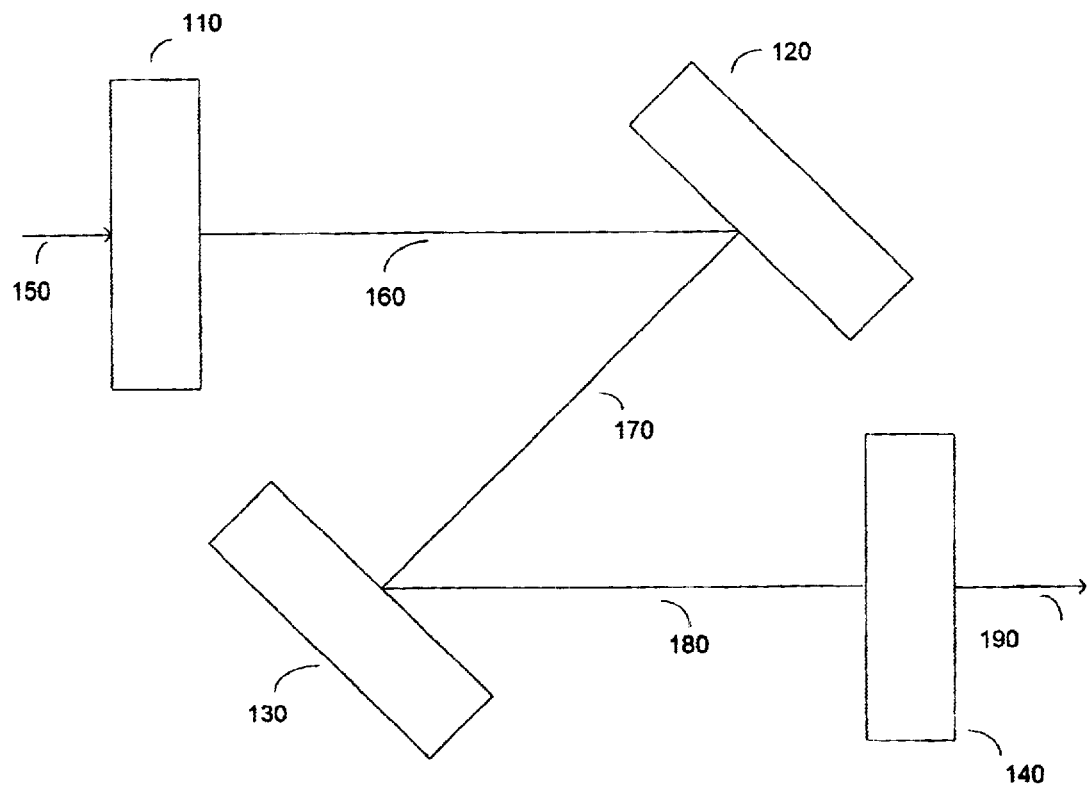
FIG. 1 is a block diagram showing an exemplary optical switch as known in the art.

FIG. 1 is a block diagram showing an exemplary optical switch 100 as known in the art. Among other things, the optical switch 100 includes input fiber collimators 110, a first MEMS array 120, a second MEMS array 130, and output fiber collimators 140. Within the optical switch 100, the first MEMS array 120 and the second MEMS array 130 are typically aligned such that each mirror of the first MEMS array 120 is directly across from a corresponding mirror of the second MEMS array 130. The input fiber collimators 110 are typically positioned so as to direct input signals from each of N input fibers to a corresponding mirror of the first MEMS array 120. The output fiber collimators 140 are typically positioned so as to direct output signals from each mirror of the second MEMS array 130 to a corresponding output fiber.

An input optical signal 150 from an input fiber is directed by an input fiber collimators 160 toward a corresponding mirror of the first MEMS array 120, as shown by the line 160. The mirror of the first MEMS array 120 reflects the signal 160 toward a selected mirror of the second MEMS array 130 corresponding to a selected output fiber, as shown by the line 170. The selected mirror of the second MEMS array 130 reflects the signal 170 to an output fiber collimator 140, as shown by the line 180. The output fiber collimator 140 directs the signal 180 toward the corresponding output fiber, as shown by the line 190. It should be noted that the input fiber collimators 110, first MEMS array 120, second MEMS array 130, and output fiber collimators 140 are typically separated in space and are typically not coupled through a tangible optical medium (such as an optical fiber), and therefore such an optical switch is sometimes referred to as a "free space" optical switch.

Figure 2:
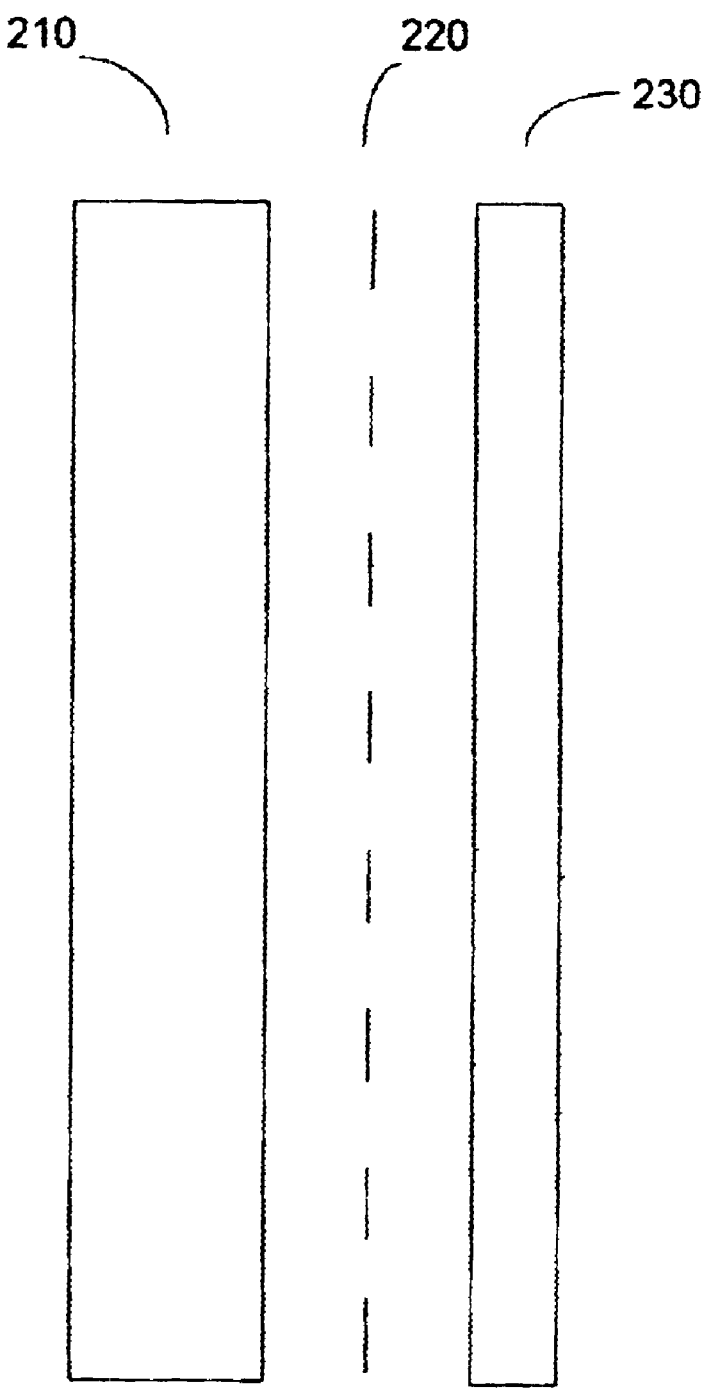
FIG. 2 is a block diagram showing a cross-sectional view of an exemplary MEMS array as known in the art.

FIG. 2 is a block diagram showing a cross-sectional view of an exemplary MEMS array 200 as known in the art. Among other things, the MEMS array 200 includes a substrate 210, a number of mirrors 220 formed on or from the substrate 210, and a cover 230. The mirrors 220 are typically suspended from the substrate 210 on minute tethers (not shown for convenience) that allow the mirrors to move through some range of motion. The position of each mirror 220 is typically controlled electronically, for example, using electrostatic forces. The cover 230 protects the extremely fragile mirrors 220 and also enables optical signals to pass to and from the mirrors 220.

In an embodiment of the present invention, a single MEMS device includes all components necessary to switch optical signals between N inputs and N outputs. Specifically, N input fiber collimators, two sets of N movable mirrors, and N Output fiber collimators are formed on a single MEMS substrate. The MEMS cover is mirrored on the side facing toward the lenses and mirrors. Each of the first set of mirrors receives an optical signal from a predetermined one of the input fibers. Each of the second set of mirrors directs an optical signal to a predetermined one of the output fibers. The N input fiber collimators and the mirrored cover combine to direct optical signals from the N input fibers respectively to the first set of N movable mirrors. Each of the first set of N movable mirrors can be positioned so as to direct the optical signal to a mirror of the second set of N movable mirrors corresponding to a predetermined output fiber. Each of the second set of N movable mirrors can be positioned so as to direct the optical signal through an output fiber collimator to the corresponding output fiber. In this way, the N optical signals are switched from the N input fibers to the N output fibers.

For convenience, various aspects of the present invention are demonstrated by example with reference to an exemplary 2×2 switch having two inputs couplable to two input fibers and two outputs couplable to two output fibers. The optical switch includes two input fiber collimators, two sets of mirrors with two mirrors in each set, and two output fiber collimators. The optical switch is capable of switching input signals from any input fiber to any output fiber.

Figure 3:
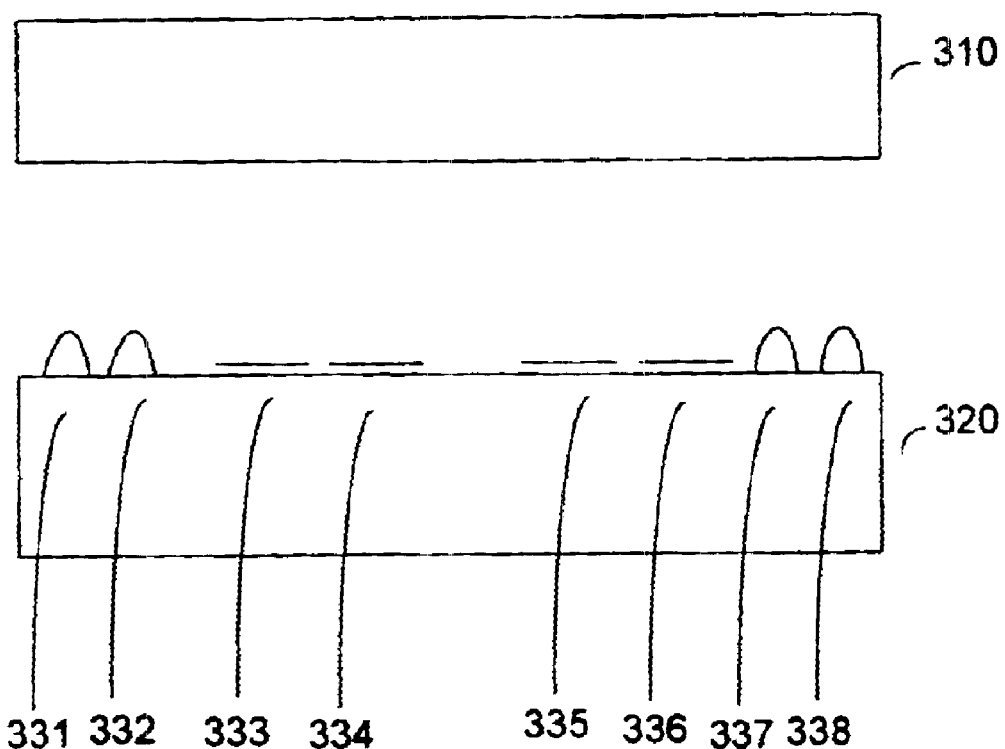
FIG. 3 is a block diagram showing an exemplary 2×2 optical switch in accordance with an embodiment of the present invention.

FIG. 3 is a block diagram showing an exemplary 2×2 optical switch 300 in accordance with an embodiment of the present invention. Among other things, the optical switch 300 includes a mirrored cover 310 and a substrate 320. On the substrate 320 are formed input fiber collimators 331 and 332, a first set of movable mirrors 333 and 334, a second set of movable mirrors 335 and 336, and output fiber collimators 337 and 338. The input fiber collimators 331 and 332 direct optical signals from two input fibers respectively to mirrors 333 and 334. The mirrors 335 and 336 direct optical signals respectively through output lenses 337 and 338 to two output fibers. The mirror 333 can be positioned to direct its optical signal to either the mirror 335 for switching the optical signal to a first output fiber via the output fiber collimator 337 or the mirror 336 for switching the optical signal to a second output fiber via the output fiber collimator 338. Similarly, the mirror 334 can be positioned to direct its optical signal to either the mirror 335 for switching the optical signal to the first output fiber via the output fiber collimator 337 or the mirror 336 for switching the optical signal to the second output fiber via the output fiber collimator 338. The mirrors 335 and 336 are positioned as appropriate to direct the optical signals to the output fibers through the output lenses 337 and 338, respectively.

Figure 4:
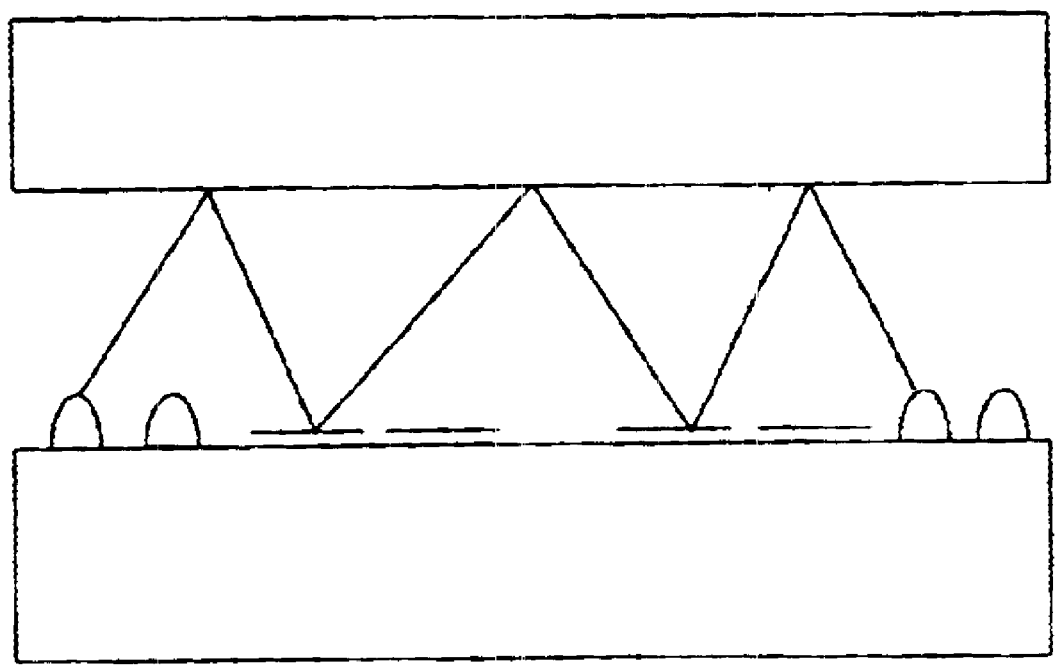
FIG. 4 is a block diagram showing an optical signal switched from a first input fiber to a first output fiber in accordance with an embodiment of the present invention.

FIG. 4 is a block diagram showing an optical signal switched from a first input fiber to a first output fiber. Specifically, the optical signal is directed from the input fiber collimator 331 to the mirror 333 via the mirrored cover. The mirror 333 is positioned so as to direct the optical signal to the mirror 335 via the mirrored cover. The mirror 335 is positioned so as to direct the optical signal to the output fiber collimator 337 via the mirrored cover.

Figure 5:
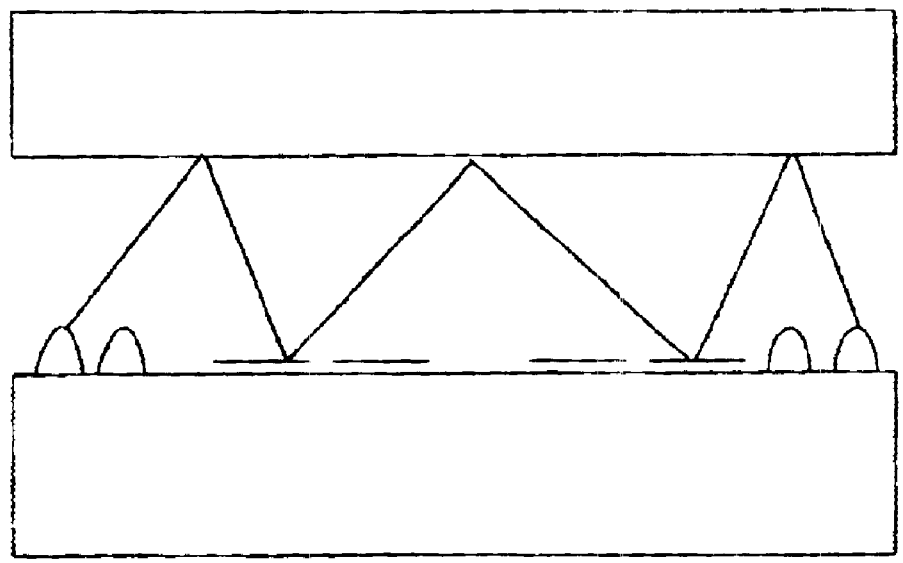
FIG. 5 is a block diagram showing an optical signal switched from a first input fiber to a second output fiber in accordance with an embodiment of the present invention.

FIG. 5 is a block diagram showing an optical signal switched from a first input fiber to a second output fiber. Specifically, the optical signal is directed from the input fiber collimator 331 to the mirror 333 via the mirrored cover. The mirror 333 is positioned so as to direct the optical signal to the mirror 336 via the mirrored cover. The mirror 336 is positioned so as to direct the optical signal to the output fiber collimator 338 via the mirrored cover.

Figure 6:
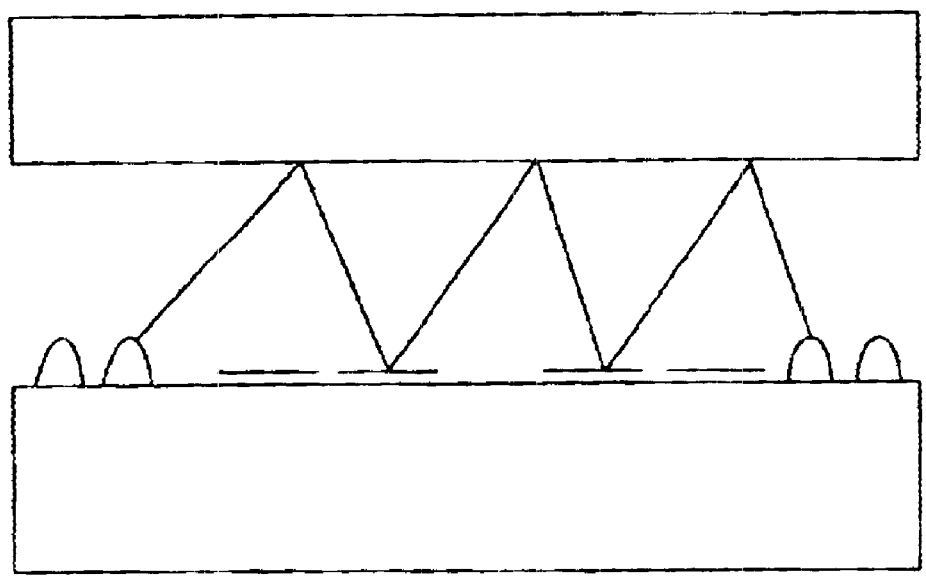
FIG. 6 is a block diagram showing an optical signal switched from a second input fiber to a first output fiber in accordance with an embodiment of the present invention.

FIG. 6 is a block diagram showing an optical signal switched from a second input fiber to a first output fiber. Specifically, the optical signal is directed from the input fiber collimator 332 to the mirror 334 via the mirrored cover. The mirror 334 is positioned so as to direct the optical signal to the mirror 335 via the mirrored cover. The mirror 335 is positioned so as to direct the optical signal to the output fiber collimator 337 via the mirrored cover.

Figure 7:
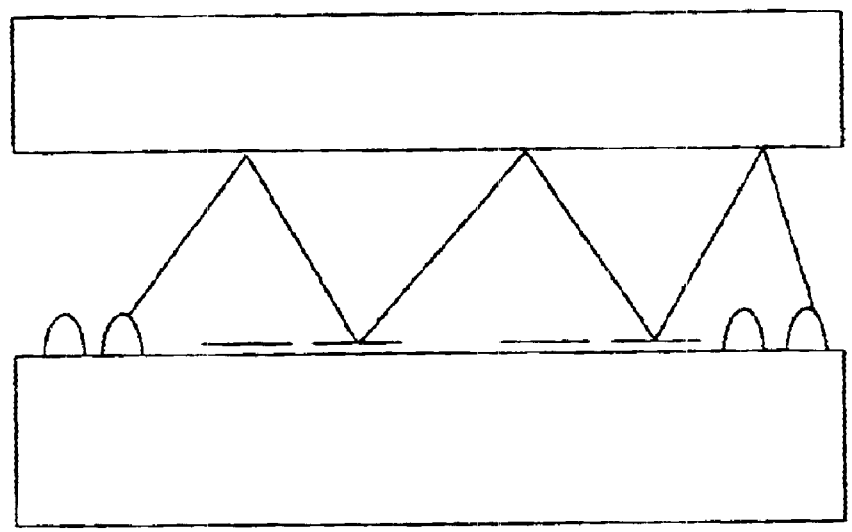
FIG. 7 is a block diagram showing an optical signal switched from a second input fiber to a second output fiber in accordance with an embodiment of the present invention.

FIG. 7 is a block diagram showing an optical signal switched from a second input fiber to a second output fiber. Specifically, the optical signal is directed from the input fiber collimator 332 to the mirror 334 via the mirrored cover. The mirror 334 is positioned so as to direct the optical signal to the mirror 336 via the mirrored cover. The mirror 336 is positioned so as to direct the optical signal to the output fiber collimator 338 via the mirrored cover.

Because the input fiber collimators and mirrored cover are not movable, they must be designed so as to direct the incoming optical signals from the input fibers to the first set of mirrors. Similarly, because the mirrored cover and output fiber collimators are not movable, they must be designed so as to direct the outgoing optical signals from the second set of mirrors to the output fibers. Moreover, the mirrored cover and output fiber collimators are preferably designed so that the outgoing optical signals enter the output fibers axially in order to reduce signal loss.

Figure 8:
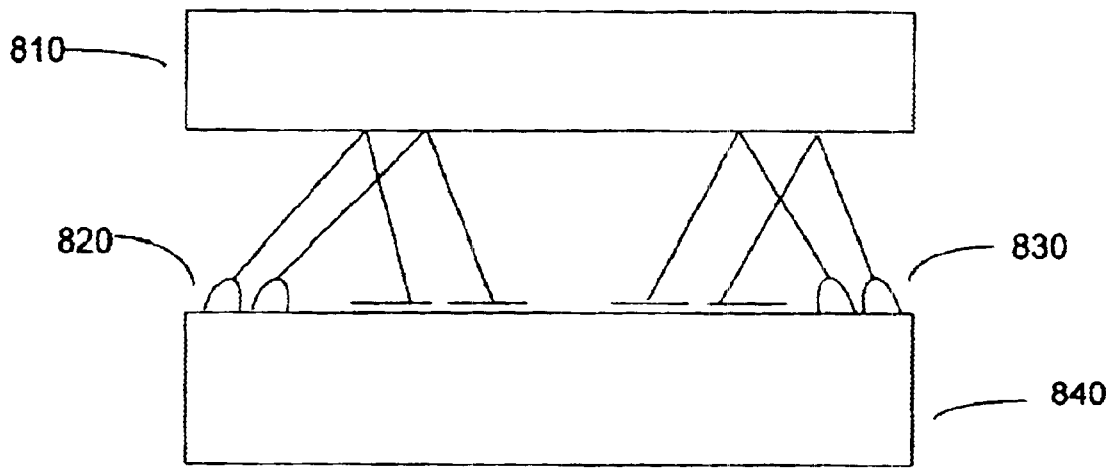
FIG. 8 is a block diagram showing an exemplary optical switch in which the incoming and outgoing optical signals are directed in part by setting the input and output lenses at an appropriate angle relative to a flat mirrored cover in accordance with an embodiment-of the present invention.

FIG. 8 shows an exemplary optical switch 800 in which the incoming and outgoing optical signals are directed in part by setting the input and output fiber collimators at an appropriate angle relative to a flat mirrored cover. Specifically, the input fiber collimators 820 and output fiber collimators 830 are positioned on the substrate 840 at an angle relative to the flat mirrored cover 810. The incoming optical signals are directed from the input fiber collimators 820 to the first set of mirrors via the flat mirrored cover 810. Similarly, the outgoing optical signals are directed from the second set of mirrors to the output fiber collimators 830 via the flat mirrored cover 810.

Figure 9:
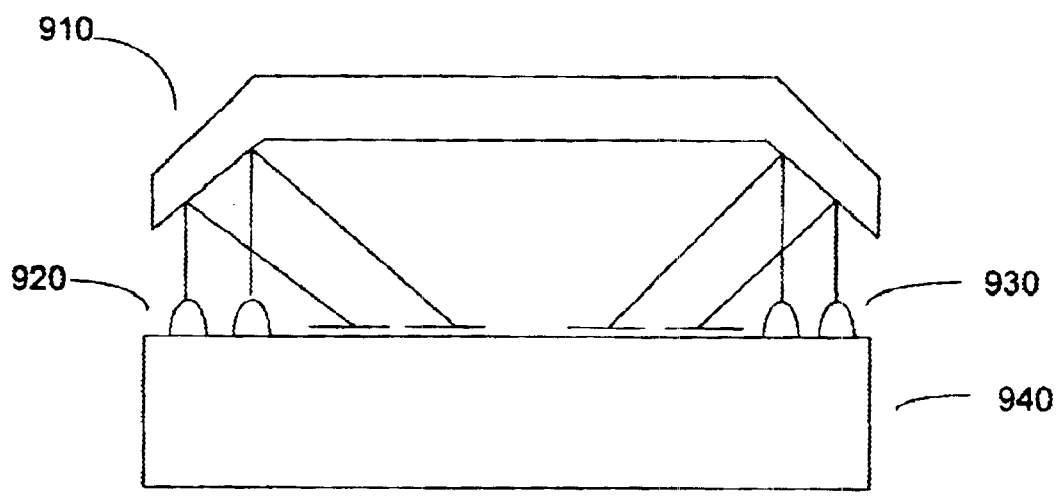
FIG. 9 is a block diagram showing an exemplary optical switch in which the incoming and outgoing optical signals are directed in part by setting the ends of the mirrored cover at an appropriate angle in accordance with an embodiment of the present invention.

FIG. 9 shows an exemplary optical switch 900 in which the incoming and outgoing optical signals are directed in part by setting the ends of the mirrored cover at an appropriate angle. Specifically, the mirrored cover 910 is angled at both ends. The incoming optical signals are directed from the input fiber collimators 920 to the first set of mirrors via an angled portion of the mirrored cover 910. Similarly, the outgoing optical signals are directed from the second set of mirrors to the output fiber collimators 930 via an angled portion of the mirrored cover 910. The input fiber collimators 920 and output fiber collimators 930 are positioned on the substrate 940 as appropriate.

Figure 10:
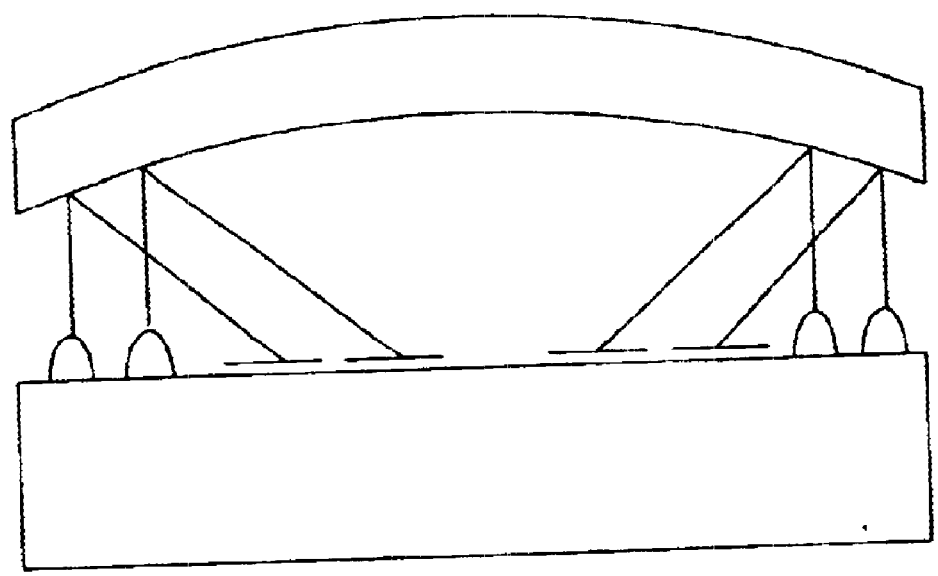
FIG. 10 is a block diagram showing an exemplary optical switch in which the incoming and outgoing optical signals are directed in part using a curved mirrored cover in accordance with an embodiment of the present invention.

FIG. 10 shows an exemplary optical switch 1000 in which the incoming and outgoing optical signals are directed in part using a curved mirrored cover. Specifically, the mirrored cover 1010 is curved in such a way that the incoming optical signals are directed from the input fiber collimators 1020 to the first set of mirrors and the outgoing optical signals are directed from the second set of mirrors to the output fiber collimators 1030. The input fiber collimators 1020 and output fiber collimators 1030 are positioned on the substrate 1040 as appropriate.

Figure 12:
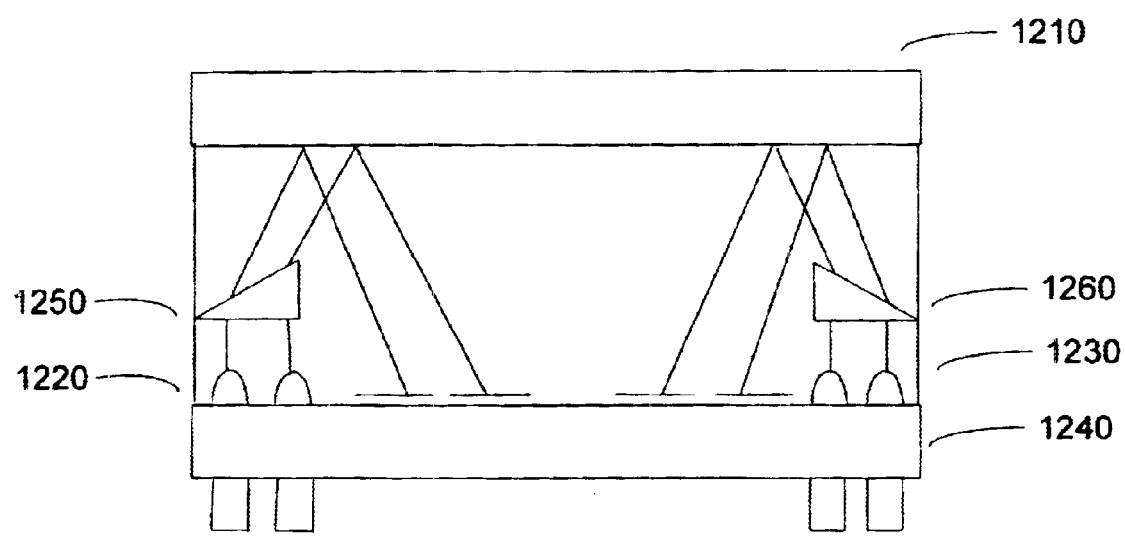
FIG. 12 shows an exemplary optical switch 1200 in which the incoming and outgoing optical signals are directed in part using optical wedges in accordance with an embodiment of the present invention.

FIG. 12 shows an exemplary optical switch 1200 in which the incoming and outgoing optical signals are directed in part using optical wedges in accordance with an embodiment of the present invention. Specifically, the input collimators 1220 and output collimators 1230 are positioned in the substrate 1240 facing substantially toward the mirrored cover 1210. An input optical wedge 1250 is positioned between the input collimators 1250 and the mirrored cover 1210 in order to direct the incoming signals to the first set of mirrors. An output optical wedge 1260 is positioned between the output collimators 1230 and the mirrored cover 1210 in order to direct the outgoing signals from the second set of mirrors.

It should be noted that the fiber collimators and movable mirrors need not be positioned linearly on the substrate.

Figure 13:
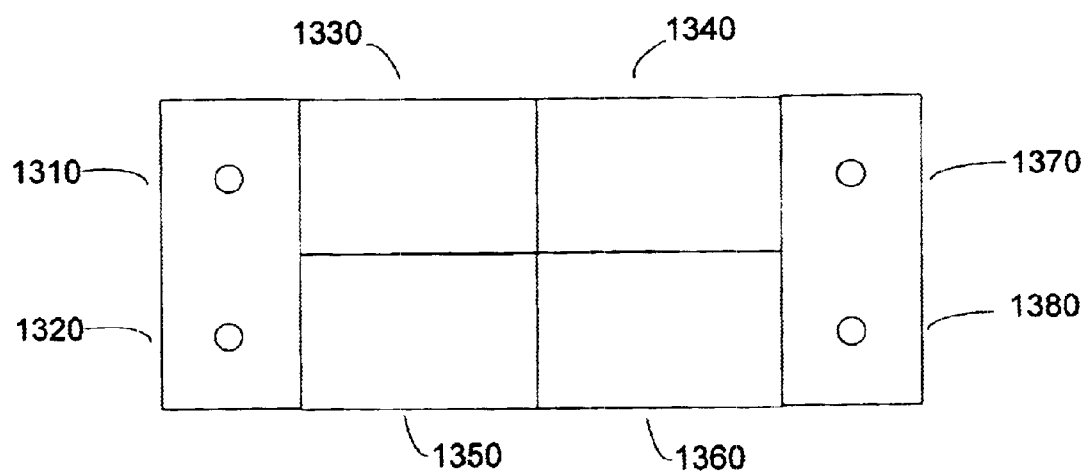
FIG. 13 shows an exemplary optical switch 1300 in which two adjacent collimator/mirror configurations are used to switch optical signals from two input fibers to two output fibers in accordance with an embodiment of the present invention.

FIG. 13 shows an exemplary optical switch 1300 in which two adjacent collimator/mirror configurations are used to switch optical signals from two input fibers to two output fibers in accordance with an embodiment of the present invention. Specifically, the optical switch 1300 includes two input fiber collimators 1310 and 1320, a first set of movable mirrors 1330 and 1350, a second set of movable mirrors 1340 and 1360, and two output fiber collimators 1370 and 1380. The input fiber collimator 1310 directs a corresponding input signal to the movable mirror 1330. The input fiber collimator 1320 directs a corresponding input signal to the movable mirror 1350. The output fiber collimator 1370 receives a corresponding output signal from the movable mirror 1340. The output fiber collimator 1380 receives a corresponding output signal from the movable mirror 1360. The movable mirror 1330 can be controlled to direct the input signal from the input fiber collimator 1310 to either the movable mirror 1340 for switching the signal to the output fiber collimator 1370 or the movable mirror 1360 for switching the signal to the output fiber collimator 1380. The movable mirror 1350 can be controlled to direct the input signal from the input fiber collimator 1320 to either the movable mirror 1340 for switching the signal to the output fiber collimator 1370 or the movable mirror 1360 for switching the signal to the output fiber collimator 1380.

It should be noted that a configuration of fiber collimators and mirrors, such as the configuration shown in FIG. 3 or FIG. 13, can be replicated multiple times on the substrate and covered by a single fixed mirrored cover to form a 2×2×N optical switch.

Figure 14:
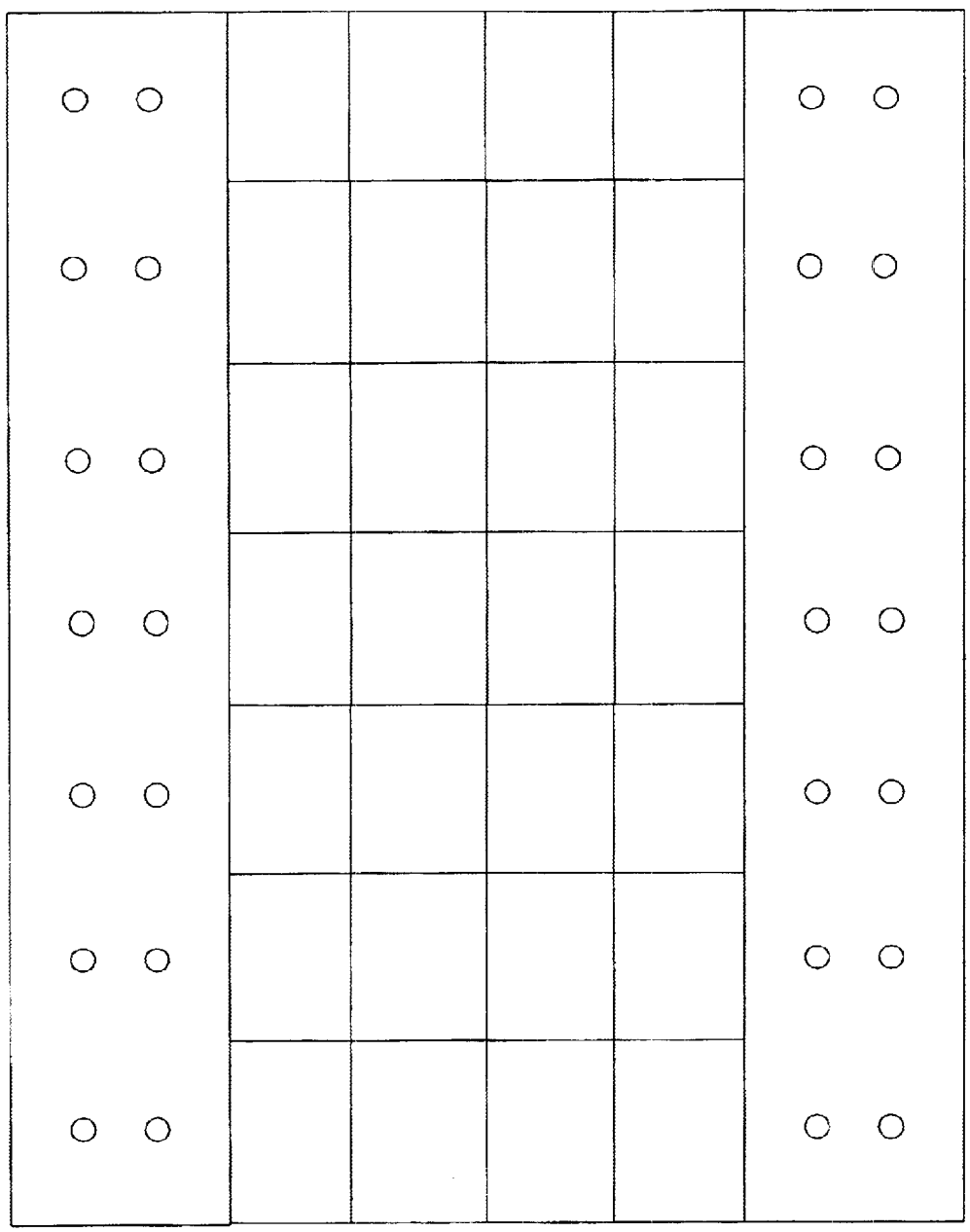
FIG. 14 shows an exemplary 2×2×N optical switch 1400 based upon a linear configuration of fiber collimators and movable mirrors in accordance with an embodiment of the present invention.

FIG. 14 shows an exemplary 2×2×N optical switch 1400 based upon a linear configuration of fiber collimators and movable mirrors in accordance with an embodiment of the present invention. Each 2×2 switch includes two input fiber collimators, four movable mirrors, and two output fiber collimators. In this example, the fiber collimators and movable mirrors associated with each 2×2 switch are linearly aligned on the substrate.

It should be noted that certain embodiments of the present invention will accommodate movable mirrors with one axis of rotation for switching optical signals, while other embodiments may require or benefit from movable mirrors with two axes of rotation for switching optical signals. Even in embodiments of the present invention that can accommodate movable mirrors with one axis of rotation for switching optical signals, it may be beneficial to use movable mirrors with two axes of rotation, with the second axis of rotation being used for non-switching purposes such as beam alignment.

Although various aspects of the present invention are described above with reference to 2×2 switches, it will be apparent to a skilled artisan how various embodiments of the present invention can be expanded to support higher level switching (e.g., 3×3, 4×4, etc.). For example, a 3×3 switch might be built by positioning three input fiber collimators, six movable mirrors, and three output fiber collimators linearly on the substrate or by placing three adjacent collimator/mirror configurations on the substrate, with each collimator/mirror configuration having an input fiber collimator, two movable mirrors, and an output fiber collimator.

All movable mirrors on the substrate can be controlled independently in order to direct optical signals from the first set of mirrors to the second set of mirrors and from the second set of mirrors to the output lenses. Specifically, the movable mirrors must be positioned at different angles in order to switch optical signals from the input fibers to the output fibers. Therefore, the optical switch typically includes control logic for controlling and positioning the movable mirrors. Among other things, the control logic determines the desired position for each movable mirror and generates the appropriate electronic signals to place each movable mirror in its desired position.

Figure 11:
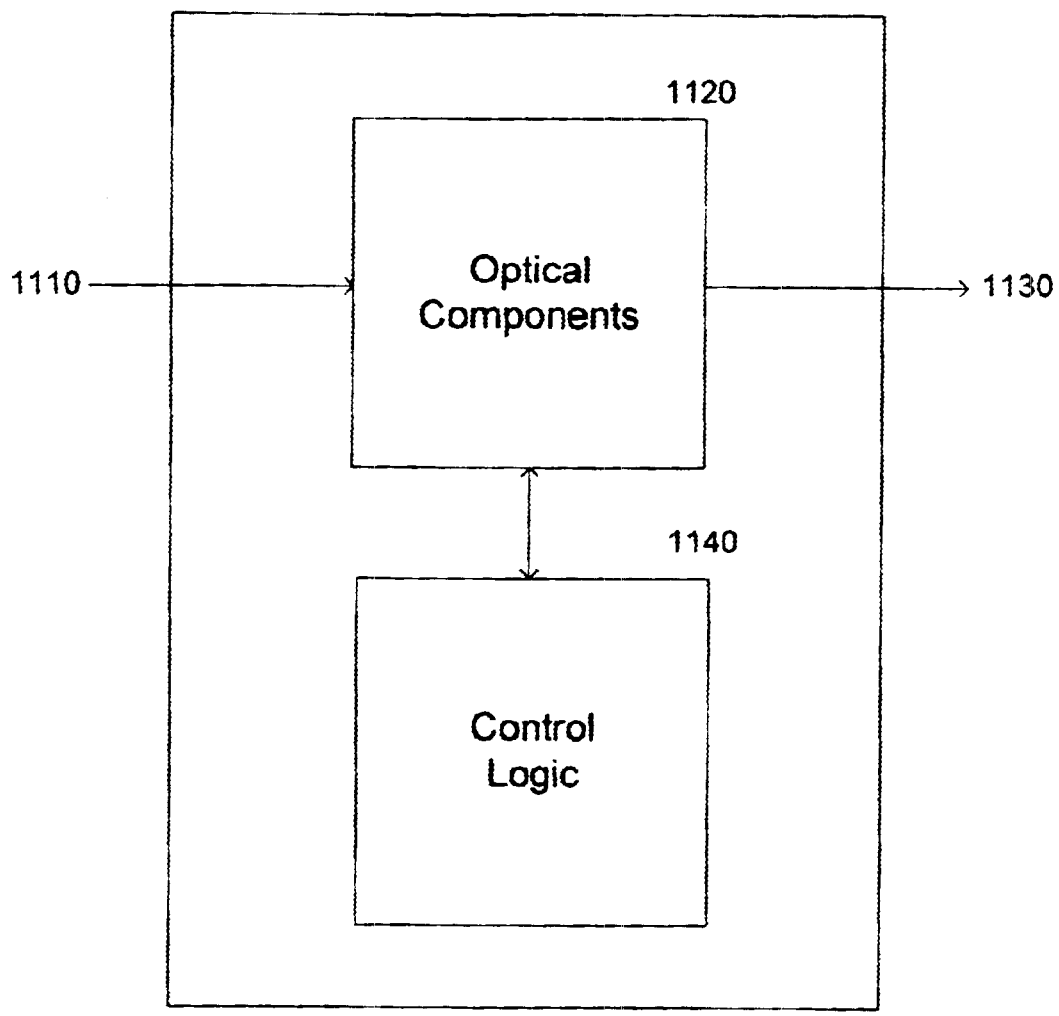
FIG. 11 is a block diagram showing the relevant components of an exemplary optical switch in accordance with an embodiment of the present invention.

FIG. 11 is a block diagram showing the relevant components of an exemplary optical switch 1100. Among other things, the optical switch 1100 includes various optical components 1120 and control logic 1140. The optical components 1120 typically include various fiber collimators and mirrors for switching optical signals from input fibers 1110 to output fibers 1130. The control logic 1140 typically includes logic for determining the desired position for each movable mirror in the optical components 1120 and for sending appropriate electronic signals to the optical components 1120 to place each movable mirror in its desired position.

The control logic 1140 may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the control logic 1140 may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the control logic 1140 may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

The present invention may be embodied in other specific forms without departing from the true scope of the invention. The described embodiments are to be considered in all respects only as illustrative and not restrictive.

What is claimed is:

1. An optical switching system comprising:
a substrate having a surface including a plurality of input fiber collimators, a first plurality of movable mirrors, a second plurality of movable mirrors, and a plurality of output fiber collimators; and
a mirrored cover positioned facing said surface for directing optical signals from the plurality of input fiber collimators to the first plurality of movable mirrors, from the first plurality of movable mirrors to the second plurality of movable mirrors, and from the second plurality of movable mirrors to the plurality of output fiber collimators.

2. The optical switching system of claim 1, wherein each input fiber collimator is positioned relative to the mirrored cover so as to direct an optical signal from an input fiber to a predetermined mirror of the first plurality of mirrors via the mirrored cover.

3. The optical switching system of claim 2, wherein the mirrored cover comprises an angled portion for directing the optical signals from the input fiber collimators to the first plurality of mirrors.

4. The optical switching system of claim 2, wherein the mirrored cover comprises a curved portion for directing the optical signals from the input fiber collimators to the first plurality of mirrors.

5. The optical switching system of claim 2, wherein each input fiber collimator is set at a predetermined angle relative to the substrate so as to direct the optical signal to the predetermined mirror of the first plurality of mirrors via the mirrored cover.

6. The optical switching system of claim 1, wherein each mirror of the second plurality of mirrors is positioned relative to the mirrored cover and to the plurality of output fiber collimators so as to direct an optical signal to a predetermined output fiber collimator via the mirrored cover.

7. The optical switching system of claim 6, wherein each output fiber collimator is set at a predetermined angle relative to the substrate so as to receive the optical signal from the predetermined mirror of the second plurality of mirrors via the mirrored cover.

8. The optical switching system of claim 7, wherein each output fiber collimator is substantially positioned so as to receive the optical signal from the predetermined mirror of the second plurality of mirrors via the mirrored cover axially.

9. The optical switching system of claim 6, wherein the mirrored cover comprises a curved portion for directing the optical signals from the second plurality of mirrors to the plurality of output fiber collimators.

10. The optical switching system of claim 6, wherein the mirrored cover comprises an angled portion for directing the optical signals from the second plurality of mirrors to the plurality of output fiber collimators.

11. The optical switching system of claim 1, wherein:
the plurality of input fiber collimators consists of a pair of input fiber collimators;
the first plurality of movable mirrors consists of a first pair of movable mirrors;
the second plurality of movable mirrors consists of a second pair of movable mirrors; and
the plurality of output fiber collimators consists of a pair of output fiber collimators.

12. The optical switching system of claim 11, wherein the input fiber collimators, movable mirrors, and output fiber collimators are configured linearly on the substrate.

13. The optical switching system of claim 11, wherein the substrate comprises two adjacent collimator/mirror configurations, wherein each collimator/mirror configuration comprises:
one input fiber collimator from the pair of input fiber collimators;
one movable mirror from the first pair of movable mirrors;
one movable mirror from the second pair of movable mirrors; and
output fiber collimator from the pair of output fiber collimators.

14. The optical switching system of claim 1, wherein the mirrored cover is curved toward the substrate.

15. The optical switching system of claim 1, wherein the movable mirrors are controllable electronically.

16. The optical switching system of claim 1, wherein each mirror of the first plurality of mirrors is positioned relative to the mirrored cover and to the second plurality of mirrors so as to direct an optical signal to a selected mirror of the second plurality of mirrors via the mirrored cover.

17. The optical switching system of claim 1, wherein the mirrored cover is substantially flat.

18. The optical switching system of claim 1, wherein the mirrored cover is angled toward the substrate at both ends.

19. The optical switching system of claim 1, wherein the substrate comprises a plurality of N×N optical switching configurations, wherein each N×N optical switching configuration comprises an equal number of input fiber collimators from the plurality of input fiber collimators, movable mirrors from the first plurality of movable mirrors, movable mirrors from the second plurality of movable mirrors, and output fiber collimators from the plurality of output fiber collimators.

20. The optical switching system of claim 1, further comprising:
control logic operably coupled to determine a desired position for each movable mirror and to generate control signals for setting each movable mirror to its desired position.

21. The optical switching apparatus of claim 1, further comprising:
an input optical wedge positioned between the plurality of input fiber collimators and the mirrored cover for directing optical signals from the plurality of input fiber collimators to the first plurality of movable mirrors via the mirrored cover.

22. The optical switching apparatus of claim 1, further comprising:
an output optical wedge positioned between the mirrored cover and the plurality of output fiber collimators for directing optical signals from the second plurality of movable mirrors to the plurality of output fiber collimators via the mirrored cover.

* * * * *

UNITED STATES PATENT AND TRADEMARK OFFICE
CERTIFICATE OF CORRECTION

PATENT NO. : 6,625,345 B2
DATED : September 23, 2003
INVENTOR(S) : Yakov Reznichenko It is certified that error appears in the above-identified patent and that said Letters Patent is hereby corrected as shown below:

<u>Column 10,</u>
Line 16, insert -- one -- before "output"

Signed and Sealed this

Thirteenth Day of January, 2004

JON W. DUDAS
*Acting Director of the United States Patent and Trademark Office*